Patented Nov. 6, 1923.

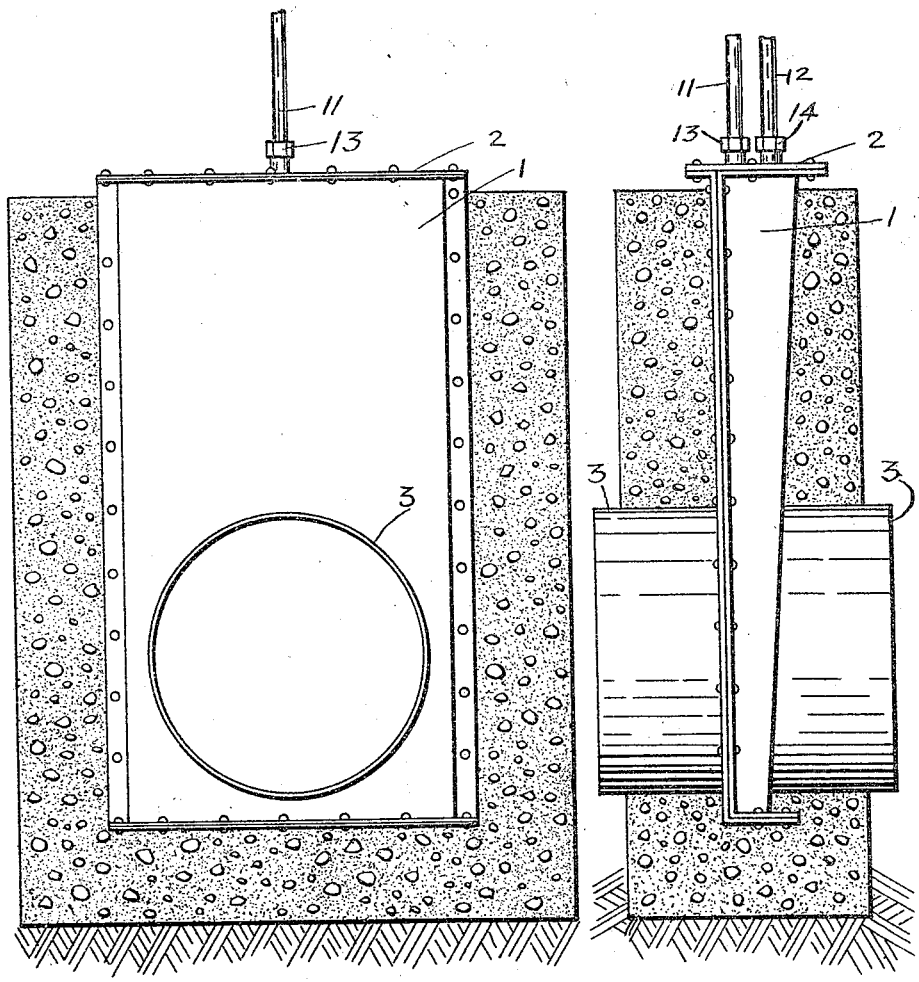

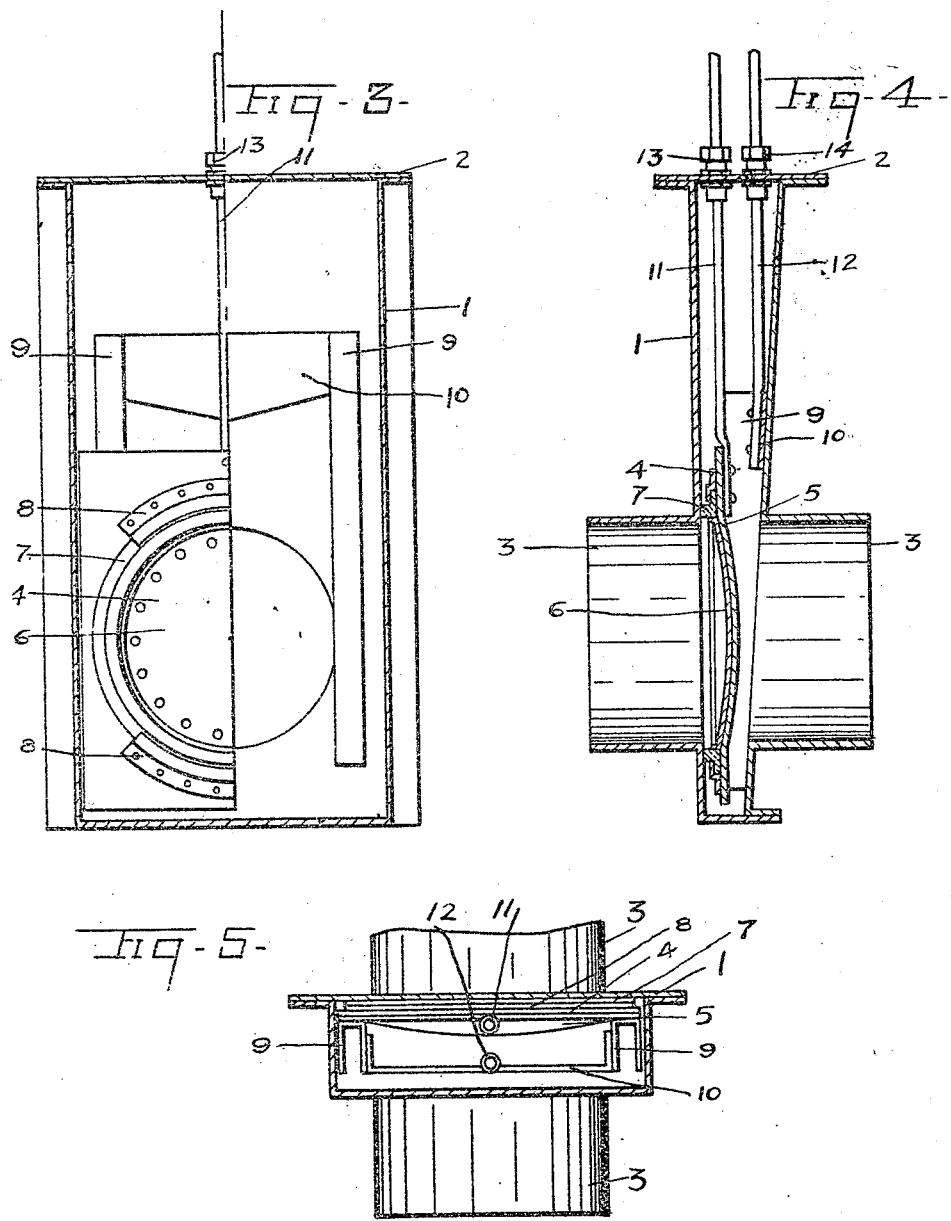

1,473,401

UNITED STATES PATENT OFFICE.

JOHN W. ELLIS, OF PORTLAND, OREGON

IRRIGATION VALVE.

Application filed November 17, 1921. Serial No. 515,871.

*To all whom it may concern:*

Be it known that I, JOHN W. ELLIS, a citizen of the United States, residing at Portland, in the county of Multnomah and State of Oregon, have invented a new and useful Irrigation Valve, of which the following is the specification.

My invention relates to a valve which can be made entirely of sheet metal and concrete, and installed in the pipe line to replace what is known as the gate valve at much less expense.

The objects of my invention are to build a head gate of sheet metal by the use of dies, the outer casing of which will be embedded in concrete after the valve has been installed in the pipe line, and to make the gate and wedge members of sheet metal which will be operated by levers, the sheet metal gate forming a gasket seat so that the gate may be entirely closed.

I attain these objects by the mechanism illustrated in the accompanying drawings, in which:

Figure 1 is an elevational view of the head gate with the concrete in section showing the manner in which the gate is to be embedded in the concrete. Figure 2 is an elevational view of the head gate form, the side with the concrete in section. In this figure the taper to the casing is shown and it will be seen that the concrete will take the pressure caused by the wedge members within. Figure 3 is a sectional view of the outside casing, showing half of the gate on the left hand side of the center line in the closed position, and the manner in which the wedge members are placed. Figure 4 is a sectional view of the head gate showing the gate in the closed position, and one of the wedge members in position to hold the gate closed. From this figure the bulge in the gate is shown and the manner in which the gasket seat is built can also be seen. Figure 5 is a sectional view of the head gate casing showing the ends of the wedge members inside, and their position with respect to the gate.

Similar numerals refer to similar parts throughout the several views.

The outside casing of the valve 1 is made wholly of sheet metal and it can be seen from Figure 2 of the drawing that one face of the case is at right angles to the center line of the pipe. The remaining face of the case is built to have a taper with respect to the face above mentioned, and the greater end of the wedge formed thereby being at the top of the valve. The sides of the case which join the two faces are parallel each to each, all of which are built and fastened together to form a water tight case with a cap 2 which closes the top.

Spigots 3—3 are built into each face of the valve so that the pipe can be connected to conduct the water when the gate is open.

The gate 4 is built on a frame 5 which is of one piece of rectangular sheet metal of such size as to slide freely in within the case 1. The center of the frame or plate is concaved over an area covered by the pipe which is to prevent buckling when under pressure from the water. A second plate 6 is concaved to fit the concaved section of the plate 5, which is circular in form and large enough to cover the passage through the valve. The edge of the plate 6 is turned away from the plate 5 as shown in Figure 4 of the drawing. About the projecting edge of the plate 6 the gasket 7 is placed which is L shaped in cross section, the short projection thereof forming the seal when the gate is in the closed position. The two plates are fastened together in the positions above described and the gasket is held in place by the two sheet metal cleats 8—8 at the top and bottom of the gate.

The two wedge members 9—9 are in the sectional form shown in Figure 5, and taper from large at the top to small at the bottom, the taper being the same as that of the case. The wedge members are fastened together by the cross arm 10 which is of the proper size to allow the members to fall within the case and still allow the opening of the pipe to be free from obstruction. The wedge members are also placed to fall clear of the concaved part of the gate. The gate and the wedge members are assembled in the manner shown in Figures 3, 4 and 5 of the drawings. From these figures it will be seen that the pressure from the wedge members is exerted on the right and left hand sides of the gate which is forced against the case and the gasket forms a water tight joint between the two parts.

The gate and wedge members are each fastened to rods 11 and 12 which pass through the stuffing boxes 13 and 14 located in the top plate of the head gate. The rods are connected to levers by which the gate and wedge members can be operated. At the points where the rods are connected to the gate and cross arm, a small amount of play is allowed so that the number of parts will not bind when being operated.

After the valve has been installed in the pipe line in the suitable position, the outside case is made strong enough to stand the internal pressure by a concrete case built in the manner shown in Figures 1 and 2.

The operation of the valve is as follows:

The valve is shown in the closed position in all of the figures in the drawings but it can be well understood from Figures 3 and 4 how the valve is opened and closed. The wedge members are first raised to a point where the gate is free from all pressure of the members and the side of the case. When the gate is free, it may be raised to any point to allow the desired amount of water to pass through the valve. At that time the wedge members can be lowered to hold the gate in a fixed position. When the gate is closed, the wedge members are last to be operated and the pressure therefrom will seat the gasket and close the valve.

Having fully described my invention, I claim and desire to protect by Letters Patent—

1. In a valve made of sheet metal, a tapered water-tight chamber having pipe connections built into the rectangular faces of the valve, a rectangular gate having a circular concaved section at the center assembled within the chamber in such a manner as to be movable, movable wedge members having a taper common to that of the chamber and placed in such manner as to exert a pressure upon the gate when in either the closed or open position, said gate and wedge members being operated by rods connected thereto and passing through stuffing boxes at the top of the chamber, and the valve built in a concrete case to increase the strength and overcome the pressure of the water within the chamber.

2. In a valve, a rectangular gate having a circular concaved section in the center, a circular concaved plate, the concaved section of which is so shaped as to fit in the concaved section first mentioned, the edge of said circular plate being rolled to project at right angles from the rectangular plate, a gasket about the projecting edge of the circular plate and against the face of the rectangular plate, annular sheet metal cleats to hold the gasket in position, the gate being so arranged in the chamber as to allow the gasket to fall about the passage of the pipe, and seat against the inside face of the chamber, and forming a seat in conjunction with the gate as shown and described.

JOHN W. ELLIS.